US006327457B1

(12) United States Patent
Hashimoto

(10) Patent No.: US 6,327,457 B1
(45) Date of Patent: Dec. 4, 2001

(54) OPENING-CLOSING DEVICE WITH LIMITED LIFTING RANGE

(75) Inventor: Takayuki Hashimoto, Kanagawa (JP)

(73) Assignee: Katoh Electrical Machinery Co., Ltd., Kanagawa (JP)

( * ) Notice: Subject to any disclaimer, the term of this patent is extended or adjusted under 35 U.S.C. 154(b) by 0 days.

(21) Appl. No.: 09/549,144

(22) Filed: Apr. 13, 2000

(30) Foreign Application Priority Data

Apr. 14, 1999 (JP) ..................... 11-107297

(51) Int. Cl.[7] ..................... G03G 15/00; G03B 27/62
(52) U.S. Cl. ..................... 399/379; 355/75
(58) Field of Search ..................... 399/365, 379, 399/380; 355/75

(56) References Cited

U.S. PATENT DOCUMENTS 4,588,290 * 5/1986 Ohtsuka ..................... 355/76
4,853,750 * 8/1989 Murata et al. ..................... 355/75
5,541,712 * 7/1996 Fujitaka et al. ..................... 399/380
5,621,501 * 4/1997 Matsuo et al. ..................... 355/75
6,006,064 * 12/1999 Hashimoto ..................... 399/380
6,100,963 * 8/2000 Hosaka ..................... 355/75

* cited by examiner

*Primary Examiner*—Fred L. Braun
(74) *Attorney, Agent, or Firm*—Notaro & Michalos P.C.

(57) ABSTRACT

An opening-closing device is capable of automatically positioning an opened pressing mechanism horizontally in relation to a supporting table. A base member is provided for fixation to a body of an apparatus on which the pressing mechanism is to be used. A supporting member is secured pivotably to the base member and a lifting member is provided to which a rear portion of the pressing mechanism is fixed to a free end of the supporting member with a supporting pin reversibly in a direction in which the lifting member will overlap the supporting member. An elastic member forces the supporting member along with the lifting member in the opening direction of the pressing mechanism while forcing the lifting member in a direction in which the lifting member will overlap the supporting member. The opening-closing device further has a mechanism for limiting to a predetermined range, the range of the lifting member being reversible about the pivoted position relative to the supporting member and an adjusting mechanism abutting a part of the base member or the apparatus body to reverse the lifting member.

6 Claims, 9 Drawing Sheets

OPENING-CLOSING DEVICE WITH LIMITED LIFTING RANGE

BACKGROUND OF THE INVENTION

1. Field of the Invention

The present invention relates to a device for opening and closing an original pressing device which presses an original to an original supporting table of a copier, printer or the like.

2. Description of the Prior Art

Generally, the original pressing devices of this type include ones provided with an automatic original feeding apparatus and ones not provided with such an apparatus. In the former type of original pressing device, an original is automatically fed to an original supporting table by an original conveying belt and automatically evacuated from the original supporting table by the original conveying belt after a copying is made. For manually setting an original in place on the original supporting table or removing the original from on the original supporting table, the original pressing device is installed to the body of a copier for example with an opening-closing device provided between the original pressing device and copier body to facilitate opening or closing of the original pressing device. Normally, a pair of such opening-closing devices is used. For manual operation of the original pressing, the opening-closing device is constructed as follows for easy opening, to a desired intermediate angular position, of the original pressing device provided with an automatic original feeding apparatus which is sufficiently heavy to set and hold an original in place on the original supporting table, and holding the original pressing device stably at the angular position with no likelihood that the original pressing device will spontaneously fall onto the original supporting table even with the hand taken off the original pressing device. That is, the opening-closing device includes a base member for fixation to the body of a copier for example, a supporting member secured pivotably to the base member with a hinge pin and on which the original pressing device is fixed at the rear portion thereof, and an elastic member provided between the base and supporting members to elastically force the supporting member in the opening direction.

Normally, the above opening-closing devices, right and left, are provided in pair on the body of the copier and the elastic members will lift somehow the original pressing device at the opening-closing devices when the original pressing device is opened. For these reasons, there takes place a problem that the original conveying belt of the original pressing device cannot be pressed horizontally to the original supporting table, an original to be fed is moved obliquely and thus cannot be set in place, or the original cannot correctly be evacuated from on the original supporting table after a copying is made. The original pressing device cannot be set horizontally on the original supporting table when it does not dimensionally fit to the table or when the user of the copier replaces the regular original pressing device with a one with an automatic original feeding apparatus. To avoid the above, the following opening-closing device for an original pressing device has been proposed (as in the Japanese Unexamined Patent Publication No. 9-208098), which includes a base member to be fixed vertically slidably to the body of a copier for example by means of a supporting foot, a supporting member for an original pressing plate, secured at one end thereof pivotably to the base member with a hinge pin, and an elastic member provided between the free end of the supporting member and the base member to elastically force the supporting member in the direction in which the original pressing device can be opened, the opening-closing device further including a fixing plate provided between the supporting member and original pressing plate and on which a roller is installed.

This conventional opening-closing device is adapted to automatically position the original pressing device horizontally in relation to the original supporting table. Therefore, no fine adjustment is required after installation of the original pressing device and opening-closing device. However, a roller for smooth sliding of the hinge foot, roller provided on the original pressing device, etc. have to additionally be provided, so that the original pressing device with the opening-closing device has a complicated structure which will lead to an increased manufacturing cost.

OBJECTS AND SUMMARY OF THE INVENTION

Therefore, the present invention has an object to overcome the above-mentioned drawbacks of the prior art by providing an opening-closing device for an original pressing device, having a simple structure and capable of automatically positioning the opened original pressing device horizontally in relation to the original supporting table.

The above object can be attained by providing an opening-closing device for an original pressing device, having a base member for fixation to the body of an apparatus on which the original pressing device is to be used; a supporting member secured pivotably to the base member with a hinge pin; a lifting member to which the rear portion of the original pressing device fixed directly or with any fixing member to the free end of the supporting member with a supporting pin reversibly in a direction in which the lifting member will overlap the supporting member; and an elastic member provided between the base member and a different position from the pivoted position of the lifting member relative to the supporting member to force the supporting member along with the lifting member in the opening direction of the original pressing device while forcing the lifting member in a direction in which the lifting member will overlap the supporting member; the opening-closing device further including, according to the present invention, means for limiting to a predetermined range the range of the lifting member being reversible about the pivoted position relative to the supporting member; and an adjusting means abutting a part of the base member or the apparatus body when the lifting is closed to reverse the lifting member.

According to another aspect of the present invention, the elastic member may be a coil spring provided between the base and lifting members, or between a spring receiver sliding on the cam surface of a cam member installed on the side of the base member and the lifting member.

According to a still another aspect of the present invention, the limiting means may include a pin to hold on the supporting member the cam slider sliding on the cam surface of the cam member, elongated guide holes formed in both side plates of the supporting member and in which the sliding pin is inserted movably at opposite ends thereof, and elongated control holes formed in both side plates of the lifting member and each having an enlarged portion at the beginning end thereof and in which the sliding pin is inserted movably at opposite ends thereof.

According to a yet another aspect of the present invention, the adjusting means may be a rolling member installed on one or both of the side plates of the lifting member.

The above object can also be achieved by providing an opening-closing device for an original pressing device, including a base member for fixation to the body of an apparatus on which the original pressing device is to be used, consisting of a base plate and side plates rising from opposite ends of the base plate; a cam member fixed to the fixing member; a supporting member consisting of a back plate and side plates bent downward from opposite ends of the back plate, the side plates being coupled pivotably to outside the side plates of the base member with a hinge pin; a lifting member to which the original pressing device is fixed, consisting of a back plate and side plates bent downward from opposite ends of the back plate, the back plate being overlapped on the back plate of the supporting member and the side plates being coupled pivotably to the outer free ends of the side plates of the supporting member with a supporting pin; a compression spring provided between a cam slider retained slidably between the side plates of the supporting member and abutting the cam member and a pressure receiving pin fixed at a different position from the supporting pin of the lifting member; a sliding pin fixed to the cam slider and extending through elongated guide holes formed in the side plates of the supporting member near the hinge pin and elongated control holes formed in the side plates of the lifting member near the free ends and each having an enlarged portion at the beginning end thereof; and a ball bearing fixed by means of a holding member to at least one of fixing plates provided perpendicularly to the lower ends of sides plate of the lifting member and which abuts the apparatus body when the original pressing plate is closed.

These objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
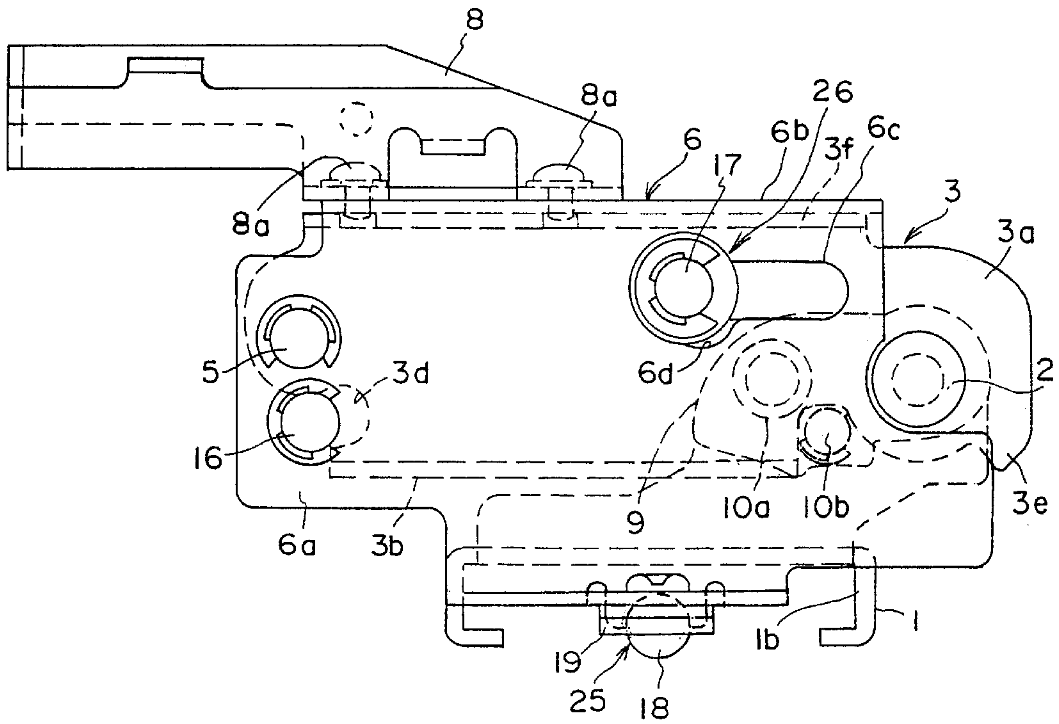
FIG. 1 is a side elevation of the original pressing device opening-closing device according to the-present invention.
Figure 2:
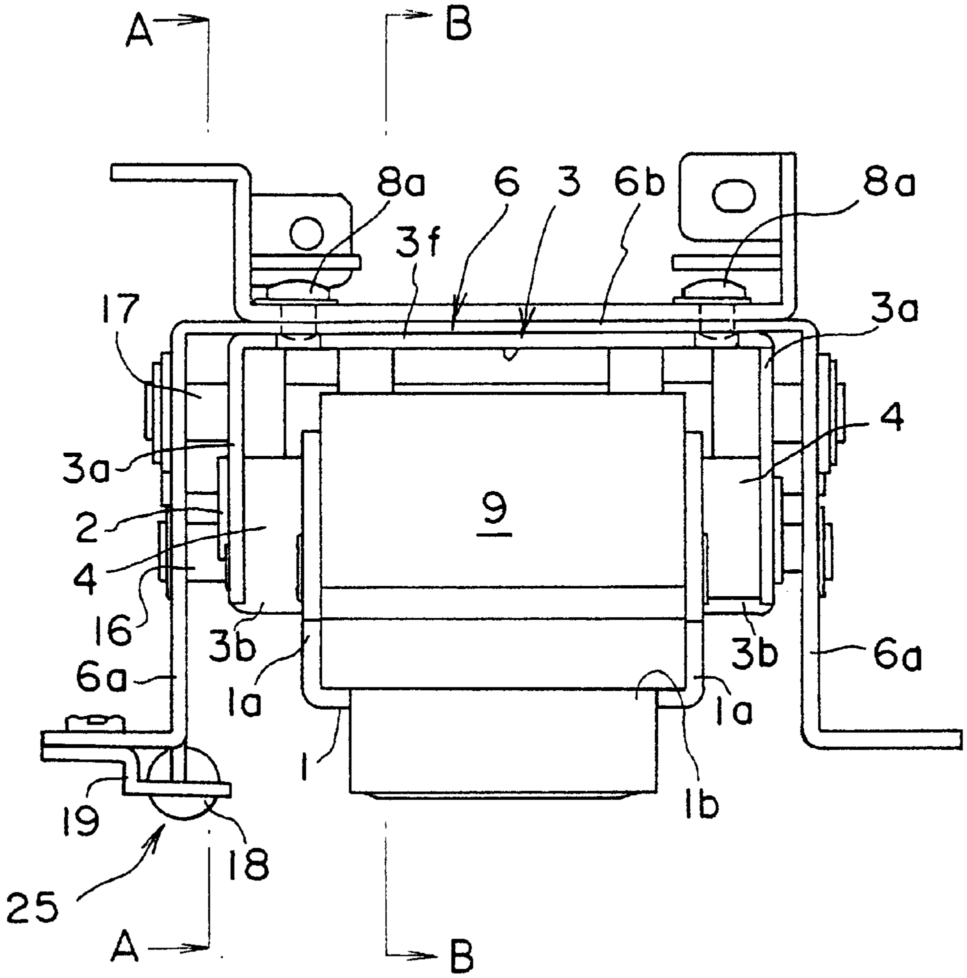
FIG. 2 is a rear view of the opening-closing device in FIG. 1.

Referring now to FIGS. 1 to 5, there is illustrated one embodiment of the opening-closing device according to the present invention. As shown, the opening-closing device includes a base member 1 consisting of side plates 1*a* and a base plate 1*b*. The base plate 1*b* is to be fixed to the body of an apparatus on which the original pressing device is used with the opening-closing device according to the present invention. The side plates la are bent upward from opposite ends of the base plate 1*b*. In addition, the opening-closing device includes a supporting member 3 consisting of side plates 3*a* and a back plate 3*f*. The side plates 3*a* are bent downward from the opposite ends of the back plate 3*f*. The side plates 3*a* of the supporting member 3 are supported rotatably on the outer surfaces of the side plates 1*a* of the base member 1 by means of a hinge pin 2 penetrated through the side plates 1*a* and 3*a*. Bearing shafts 4 are provided on the hinge pin 2 and between the side plates 1*a* and 3*a* of the base and supporting members 1 and 3, respectively. Thus the supporting member 3 can be smoothly rotated.

Figure 3:
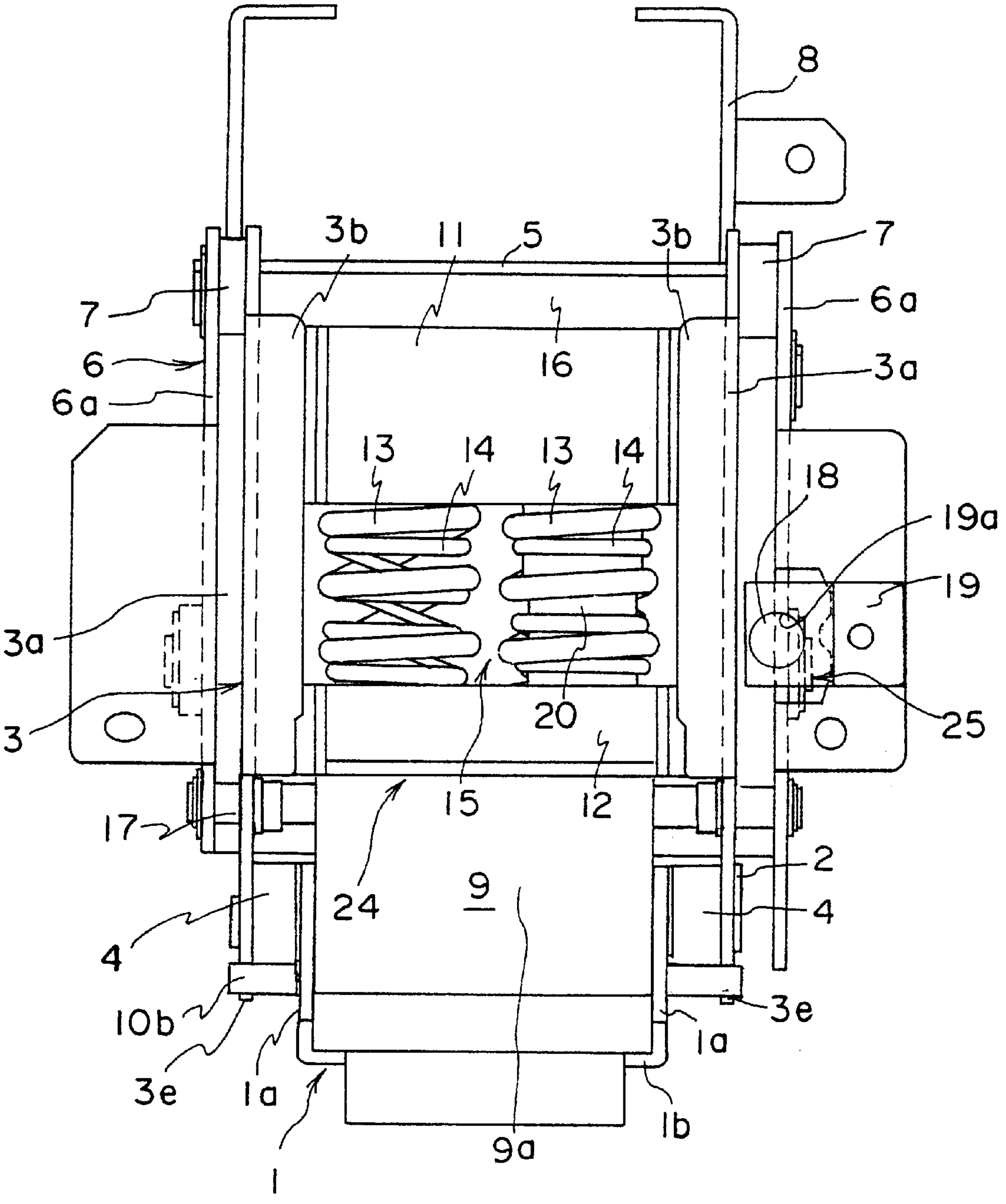
FIG. 3 is a front view of the opening-closing device in FIG. 1 with the supporting member opened.
Figure 4:
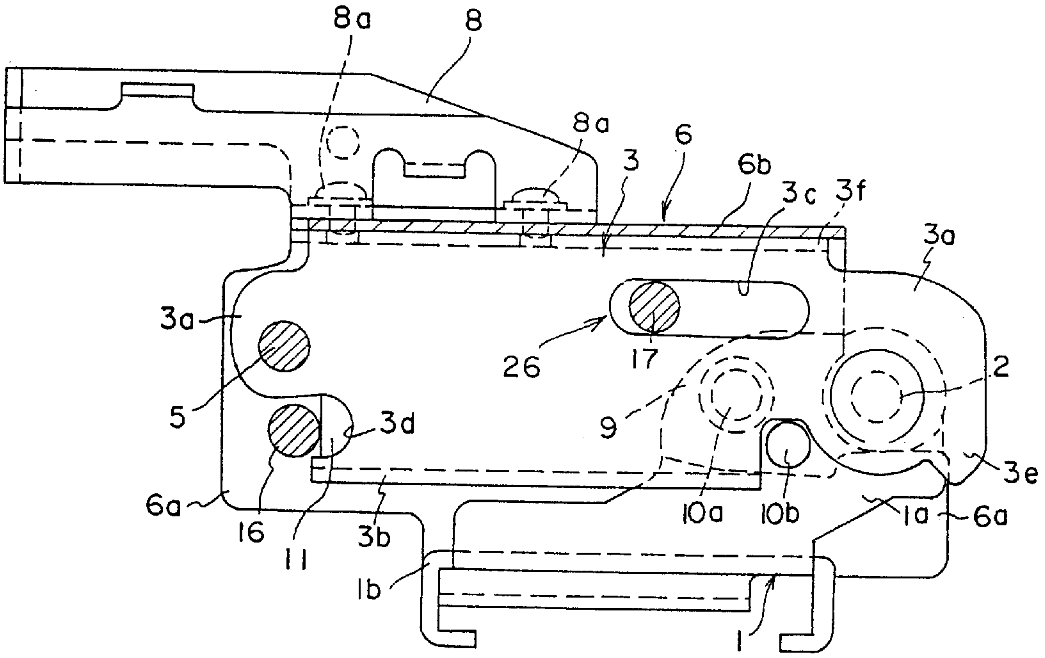
FIG. 4 is a sectional view taken along the line A—A in FIG. 2.
Figure 5:
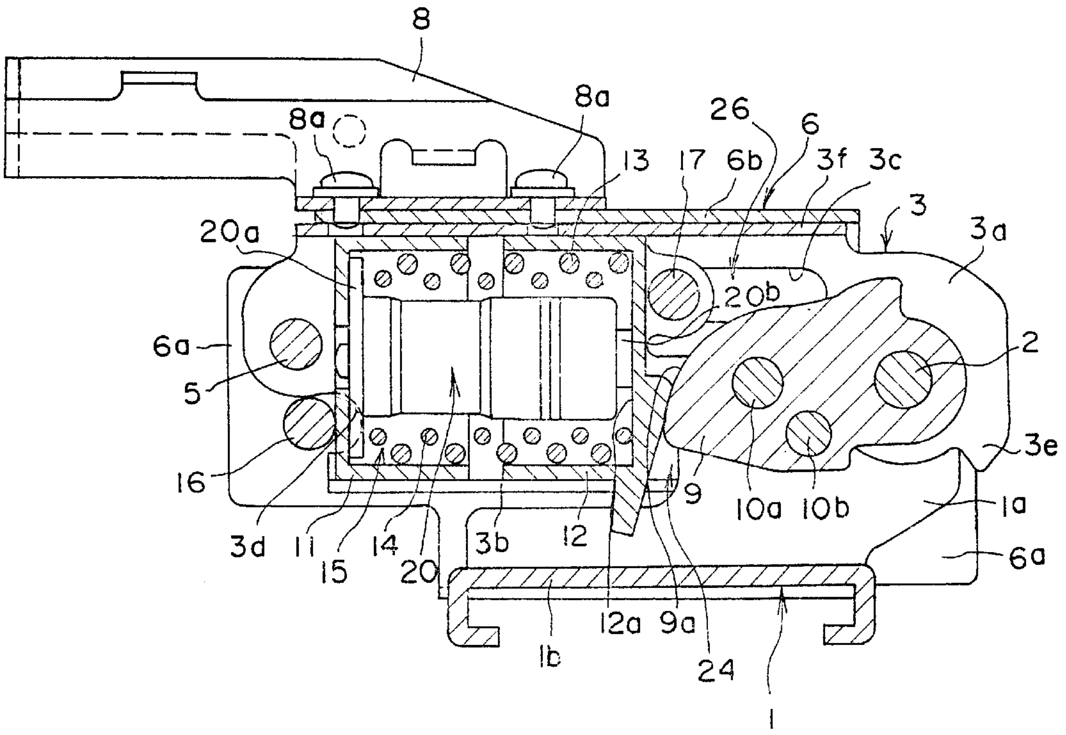
FIG. 5 is a sectional view taken along the line B—B in FIG. 2.

The opening-closing device further includes a lifting member 6 consisting of side plates 6*a* and a back plate 6*b*. The side plates 6*a* are bent downward from opposite ends of the back plate 6*b*. The side plates 6*a* of the lifting member 6 are pivoted to the outer surfaces of the side plates 3*a*, at the free ends thereof, of the supporting member 3 by means of a supporting pin 5 penetrated through the side plates 3*a* and 6*a*. Thus the lifting member 6 is rotatable in the opposite direction to the rotating direction of the supporting member 3. Collars 7 are provided on the supporting pin 5 and between the side plates 3*a* and 6*a* of the supporting and lifting members 3 and 6, respectively. This is best shown in FIG. 3.

A fixing plate 8 to which an original pressing device which will be described later is to be fixed is secured to the back plate 6*b* of the lifting member 6 with fixing screws 8*a*. A cam member 9 is secured to and between the side plates 1*a* of the base member 1 by means of the hinge pin 2 and fixing pins 10*a* and 10*b*. There are provided between the side plates 3*a* of the supporting member 3 a cylindrical spring receiver 11 and a cylindrical cam slider 12 slidably retained by retainers 3*b*. There is provided between the spring receiver 11 and cam slider 12 an elastic member 15 consisting of large and small compression springs 13 and 14 in combination. The spring receiver 11 abuts at one end thereof a pressure receiving pin 16 fixed at a position away from the supporting pin 5 through the side plates 6*a* of the lifting member 6, while the cam slider 12 abuts a cam surface 9*a* of the cam member 9. Owing to this construction, the lifting member 6 is rotated in a direction in which it will overlap the supporting member 3 while pivoting the supporting member 3 clockwise.

The cam slider 12 has fixed thereto a sliding pin 17 whose opposite ends are penetrated through elongated guide holes 3*c* (only one of them is shown) formed in the side plates 3*a* of the supporting member 3 and elongated guide holes 6*c* (only one of them is shown) formed in the side plates 6*a* of the lifting member 6 so as to overlap the elongated guide holes 3*c*. Each of the elongated guide holes 6c has an enlarged portion 6*d* at the beginning end thereof. The sliding pin and elongated guide holes 3*c* and 6*c* form together a limiting means 26 for limiting the range of the lifting member 6 rotating about the supporting pin 5. The large-diameter compression spring 13 has provided therein a damper 20 having a seat 20*a* formed at one end thereof. The damper 20 is fixed with the seat 20*a* pressed by the compression spring 13.

A rolling member 18 which is a ball bearing is held by a holder 19 and provided between one of the side plates 6*a* and a fixing plate 6e of the lifting member 6. The rolling member 18 has a lower end thereof projected downward through a hole 19*a* in the holder 19. Thus, the rolling member 18 and holder 19 form together an adjusting means 25 for adjusting the height of the lifting member 6. The free end portion of each of the side plates 3*a* of the supporting member 3 is cut at 3*d* (only one of them is shown). As the lifting member 6 is reversed about the supporting pin 5, the pressure receiving pin 16 is oscillated. The cut 6*d* permits the pressure receiving pin 16 to escape, thereby allowing the reversing of the lifting member 6. The rolling member 18 may be a roller.

The opening-closing device for the original pressing device, constructed as described in the above, functions as will be described below with reference to FIGS. 6 to 9. The base member 1 is fixed at the base plate 1*b* thereof to the body, indicated with a reference 21, of a copier (image forming apparatus), printer or the like. The original pressing device is indicated with a reference 22. The original pressing device 22 is fixed at the rear portion thereof to the lifting member 6 by means of the fixing plate 8 and fixing plates 6e. The original pressing device 22 may be fixed directly to the lifting member 6, not via the fixing plate 8.

When the original pressing device 22 thus fixed to the opening-closing device is opened, the supporting member 3 is rotated along with the lifting member 6 counterclockwise about the hinge pin 2. Thus the original pressing device 22 can be opened from an original supporting table 23. The elastic member 15 helps the user in opening the original pressing device 22, so that the original pressing device 22 will not feel so heavy when the user opens it. Even with the hand taken off from the original pressing device 22 opened to an intermediate angular position, the original pressing device 22 will be held at that angular position under the effect of the elasticity of the elastic member 15 and will not spontaneously fall onto the original supporting table 23. Note that a well-known friction mechanism may of course be incorporated in the opening-closing device to provide an intended function.

It may look as if when the hand is taken off from the opened original pressing device 22, the lifting member 6 would rotate clockwise about the supporting pin 3. However, since the elastic member 15 provided between the pressure receiving pin 16 fixed to the lifting member 6 and the base member 1 forces the lifting member 6 to rotate in the direction in which the lifting member 6 will overlap the supporting member 3, the original pressing device 22 will not spontaneously rotate clockwise.

The original pressing device 22 is openable to 90 deg. in relation to the original supporting table 23. When the original pressing device 22 is opened to the angular position of 90 deg., a stopper 3*e* provided on each of the side plates 3*a* of the supporting member 3 will abut the fixing pin 10*b*, so that the original pressing device 22 will not be opened more than 90 deg. However, it is only during servicing of the copier or the like that the original pressing device 22 is opened to 90 deg. The device 22 will not be opened to the angular position of 90 deg. during normal use of the copier or the like.

When depressed with the hand applied to the front side of the opened original pressing device 22, the supporting member 3 and lifting member 6 will be rotated clockwise about the hinge pin 2 and thus the original pressing device 22 will be closed. At this time, since the lifting member 6 is forced by the elastic member 15 to rotate in the direction in which it will overlap the supporting member 3, it will not be reversed under the weight of the original pressing device 22 when the latter is normally closed. Also, the elasticity of the elastic member 15 to push up the supporting member 3 by means of the lifting member 6, a cam mechanism 24 formed by the cam slider 12 abutting the cam member 9 and the damper 20 will allow the original pressing device 22 to smoothly be closed without abruptly falling.

The damper 20 will not work at all when the original pressing device 22 is opened counter clockwise, but will abut at a piston rod 20*b* thereof an inner bottom 12*a* of the cam slider 12 just before the original pressing device 22 is fully closed (a freely selectable angle; normally 10 deg. or so) in the course of thereof being closed, thereby permitting to prevent the original pressing device 22 from abruptly falling. In case the original pressing device 22 is provided with an automatic original feeder, it weight much. The original pressing device 22 of this type has to be securely pressed to the original supporting table 23 for smooth conveying or evacuation of an original onto or from on the original supporting table 23. Therefore, the torque of the original pressing device 22 being closed from a predetermined angular position to which the original pressing device 22 has been closed exceeds the elasticity of the elastic member 15. If the original pressing device 22 is fallen abruptly, there will be a likelihood that the hand is caught between it and original supporting table 23 or the contact glass of the table 23 is broken.

Figure 6:
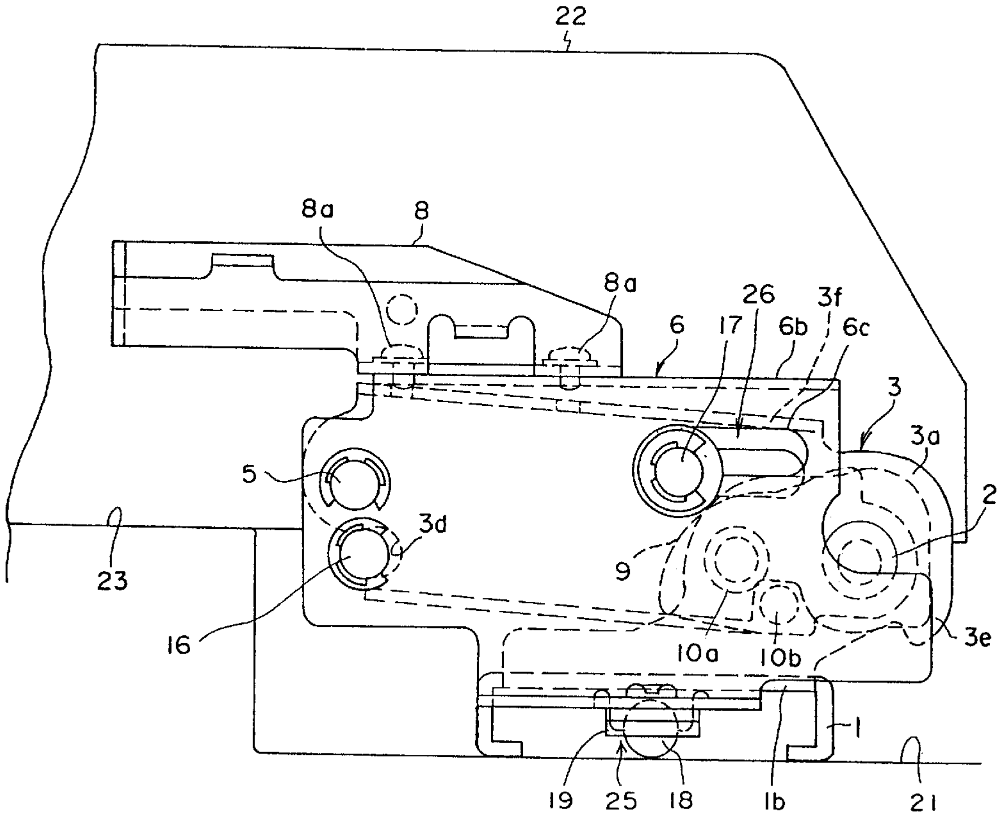
FIG. 6 is a side elevation of the opening-closing device in FIG. 1 with the original pressing device being closed.
Figure 7:
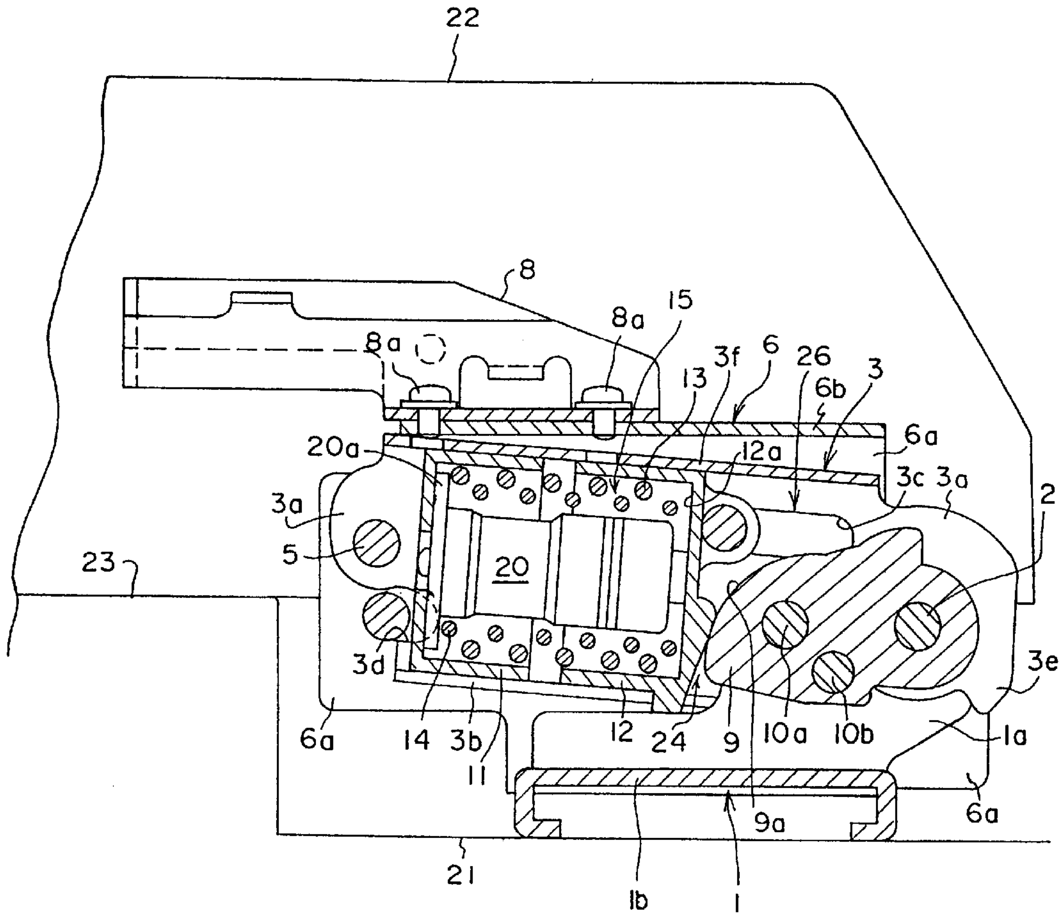
FIG. 7 is a side-elevational, sectional view of the opening-closing device in FIG. 6.
Figure 8:
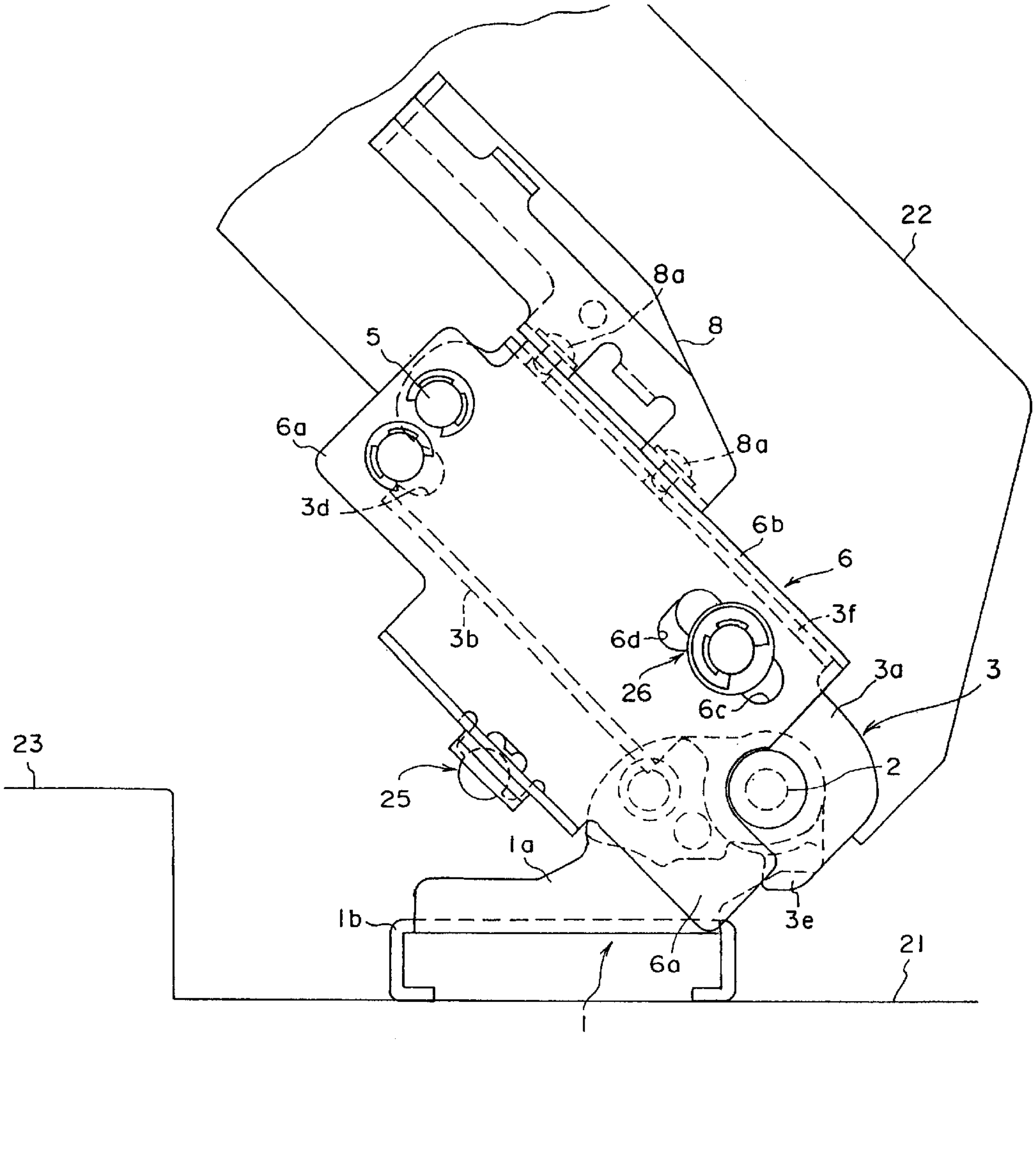
FIG. 8 is a side elevation of the opening-closing device in FIG. 1 with the original pressing device being open.
Figure 9:
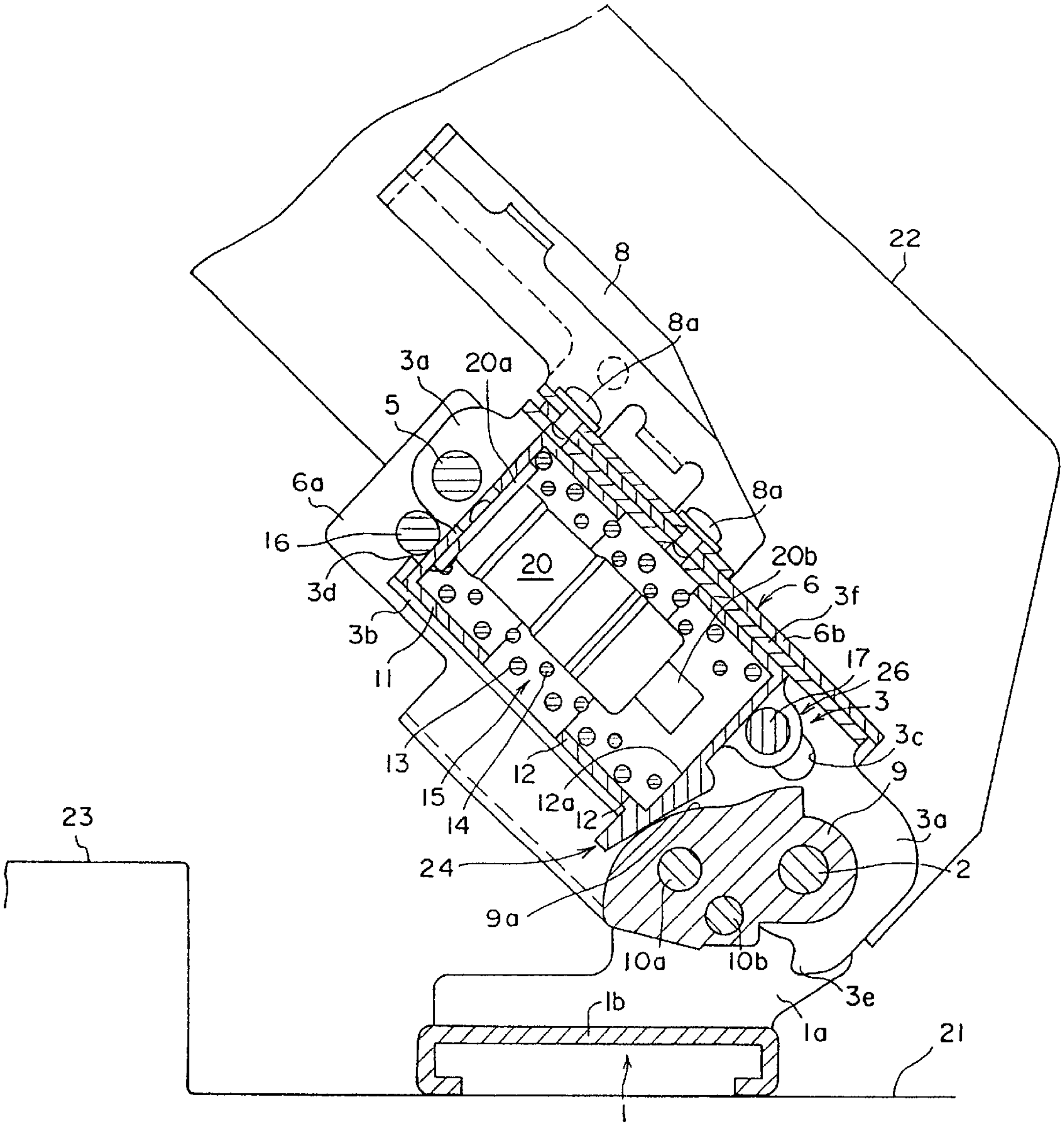
FIG. 9 is a side-elevational, sectional view of the opening-closing device in FIG. 7.

According to the present invention, the opening-closing device is further adapted such that just before the original pressing device 22 is fully closed clockwise, the rolling member 18 being a ball bearing abuts the apparatus body 21 and the lifting member 6 is reversed somewhat clockwise while the original pressing device 22 is closed. At this time, the supporting member 3 is automatically rotated a little counterclockwise from the status shown in FIG. 4 so that the original pressing device 22 will be horizontal in relation to the original supporting table 23. This is shown in FIGS. 6 and 7. Any horizontal deviation between the original pressing device 22 and original supporting table 23 (level deviation) will be compensated by the weight of the original pressing device 22 so that the latter will horizontally be pressed to the original supporting table 23.

The above means that even when there is any nonuniform horizontal deviation between the original pressing device 22 and original supporting table 23, the opened or closed angular position of the supporting member 3 about the hinge pin 2 and that of the lifting member 6 about the supporting pin 5 will automatically be corrected by the weight of the original pressing device 22.

The embodiment of the opening-closing device according to the present invention, having been described in the foregoing, uses only the elastic member 15 for controlling the weight of the original pressing device 22. This embodiment is applicable as it is to an opening-closing device in which the cam mechanism 24 is not included.

Also, the embodiment is applicable to an original pressing device not provided with any automatic original feeder.

What is claimed is:

1. An opening-closing device for an original pressing device, having:

- a base member for fixation to the body of an apparatus on which the original pressing device is to be used;
- a supporting member secured pivotably to the base member with a hinge pin;
- a lifting member to which the rear portion of the original pressing device fixed directly or with any fixing member to the free end of the supporting member with a supporting pin reversibly in a direction in which the lifting member will overlap the supporting member; and
- an elastic member provided between the base member and a different position from the pivoted position of the lifting member relative to the supporting member to force the supporting member along with the lifting member in the opening direction of the original pressing device while forcing the lifting member in a direction in which the lifting member will overlap the supporting member;

the opening-closing device further comprising:

means for limiting to a predetermined range the range of the lifting member being reversible about the pivoted position relative to the supporting member; and an adjusting means abutting a part of the base member or the apparatus body when the lifting is closed to reverse the lifting member.

2. The opening-closing device as set forth in claim 1, wherein the elastic member is a compression spring provided between the base and lifting members.

3. The opening-closing device as set forth in claim 1, wherein the elastic member is a compression spring provided between a cam slider sliding on a cam surface of a cam member installed on a side of the base member and a pressure receiving pin fixed at a different position from the supporting pin of the lifting member.

4. The opening-closing device as set forth in claim 3, wherein the limiting means includes a sliding pin fixed to the cam slider, the supporting member having a pair of side plates, elongated guide holes formed in both side plates of the supporting member and in which the sliding pin is inserted movably at opposite ends thereof, the lifting member having a pair of side plates, and elongated control holes formed in both side plates of the lifting member and each having an enlarged portion at a beginning end thereof and in which the sliding pin is inserted movably at opposite ends thereof.

5. The opening-closing device as set forth in claim 1, wherein the lifting member has a pair of side plates and the adjusting means is a rolling member installed on one or both of the side plates of the lifting member.

6. An opening-closing device for an original pressing device, comprising:

a base member for fixation to the body of an apparatus on which the original pressing device is to be used, consisting of a base plate and side plates rising from opposite ends of the base plate;

a cam member fixed to the base member;

a supporting member consisting of a back plate and side plates bent downward from opposite ends of the back plate, the side plates being coupled pivotably to outside the side plates of the base member with a hinge pin;

a lifting member to which the original pressing device is fixed, consisting of a back plate and side plates bent downward from opposite ends of the back plate, the back plate being overlapped on the back plate of the supporting member and the side plates being coupled pivotably to the outer free ends of the side plates of the supporting member with a supporting pin;

a compression spring provided between a cam slider retained slidably between the side plates of the supporting member and abutting the cam member and a pressure receiving pin fixed at a different position from the supporting pin of the lifting member;

a sliding pin fixed to the cam slider and extending through elongated guide holes formed in the side plates of the supporting member near the hinge pin and elongated control holes formed in the side plates of the lifting member near the free ends and each having an enlarged portion at the beginning end thereof; and a ball bearing fixed by means of a holding member to at least one of fixing plates provided perpendicularly to the lower ends of sides plate of the lifting member and which abuts the apparatus body when the original pressing plate is closed.

* * * * *